United States Patent [19]
McIntyre et al.

[11] 3,818,780
[45] June 25, 1974

[54] REMOTE CONTROL REARVIEW MIRROR

[75] Inventors: Matthew McIntyre, Jackson, Tenn.; Richard M. Hadley, Farmington Twp., Mich.

[73] Assignee: Jervis Corporation, Grandville, Mich.

[22] Filed: Mar. 16, 1973

[21] Appl. No.: 341,870

[52] U.S. Cl. .......................................... 74/501 M
[51] Int. Cl. ............................................ F16c 1/10
[58] Field of Search .... 74/491, 501 R, 501 M, 17.8; 350/255, 288, 289, 310, 287

[56] References Cited
UNITED STATES PATENTS
3,653,276  4/1972  McIntyre.................... 74/501 M

*Primary Examiner*—Benjamin W. Wyche
*Assistant Examiner*—Frank H. McKenzie, Jr.
*Attorney, Agent, or Firm*—Miller, Morriss, Pappas & McLeod

[57] ABSTRACT

An improved remote control connection for rearview mirrors for automobiles and like operable devices in translation using force vectors into universal movement and including a resin element at the mirror end in one-piece form connecting the mirror glass to a mirror support and providing limited hinge-like universal movement therebetween and resisting rotational movement in planes transverse to the central axis through the mirror glass.

5 Claims, 9 Drawing Figures

PATENTED JUN 25 1974 3,818,780
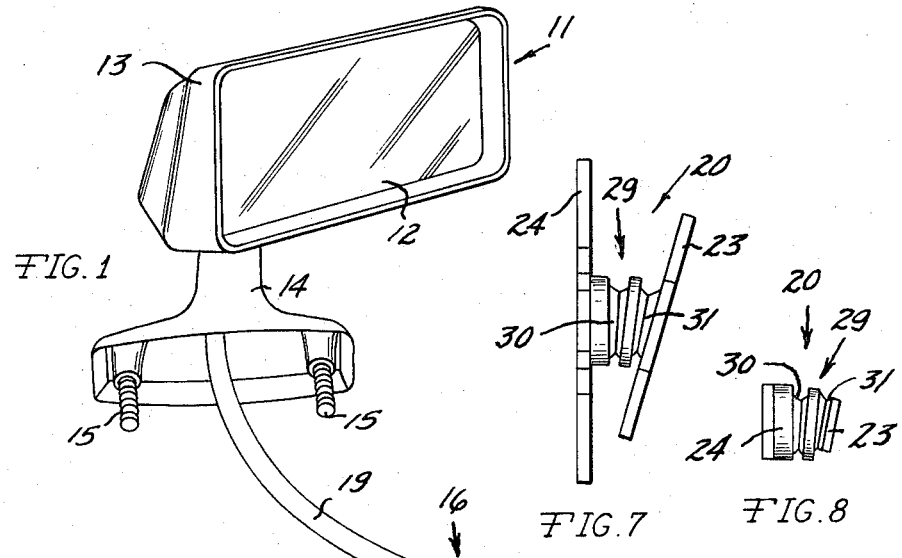
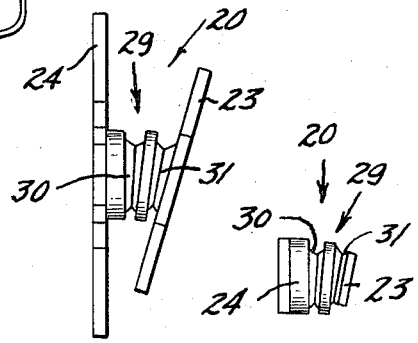
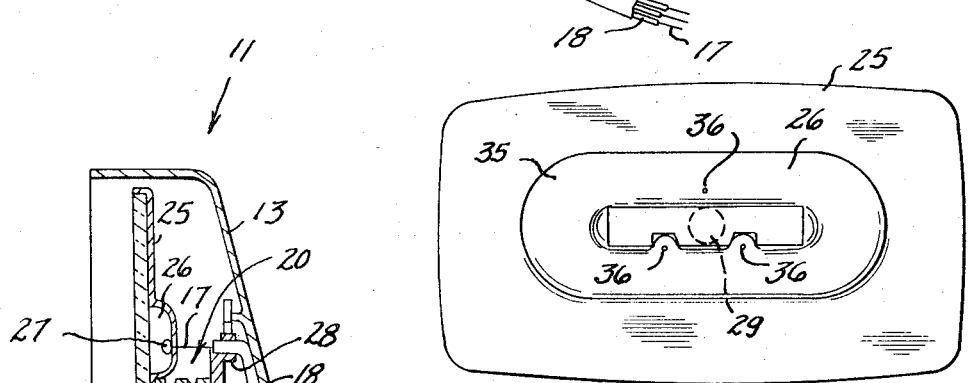
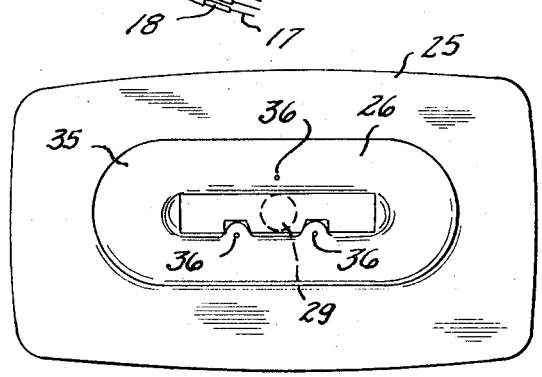
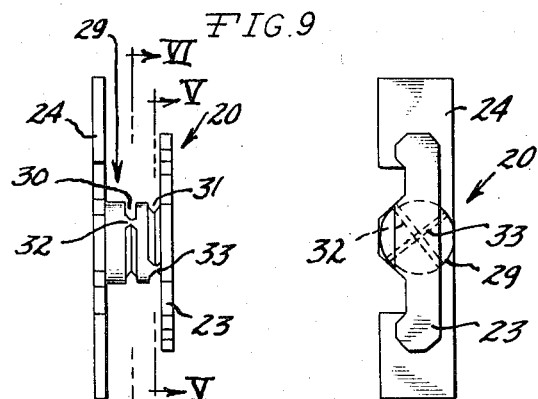
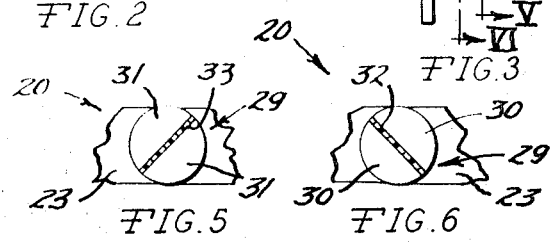

REMOTE CONTROL REARVIEW MIRROR

BACKGROUND STATEMENTS

The present invention comprises a substantially improved means for connecting a mirror in remote control rearview mirrors and similar devices. Usually, but not necessarily, such devices are of the cable or Bowden wire type. The controlled member, for example a mirror, is centrally poised at its back on a universal pivot. It is important that plural force vectors (usually three) be permitted to act on the mirror poised on the pivot for limited universal movement in accord with selected remote manipulation of the cable or wire elements. This action selects the angle setting of the plane of the mirror. However, it is also desirable to provide some means of stabilizing the mirror in any position against rotational movement in the plane of the glass at any set position. When unstabilized such rotational movement in the plane of the glass occurs in synchronization with vehicle vibrations. The typical ball, pivot, or socketed point connections do not in and of themselves resist rotation of the glass except as they may be frictionally secured through spring means or tightness of socket on ball to provide frictional resistance to rotation. The cables or wires are almost useless in resisting rotation of the glass since the cables and wires are essentially tension and compression transmitting members. They are rather easily swivelled by eccentric forces. If their tension is increased, frictional factors in the universal joint and in the cable/wire connections increase to the point of serious interference with the ease of actuation. Addition of friction makes the action stiff and erratic. To avoid rotation in the plane of the glass, it has been customary to provide guide posts extending from the case or bracket and into the false backing on the mirror glass. Grommets assist in avoiding noise or vibration chatter in such stabilizing situations but the resilience in the grommets allow a substantial amount of visually perceived rotation of the glass. This is exaggerated by certain types of road vibrations and even mechanical vibrations in the vehicle to which the mirror devices are attached. Since modern mirror glass is usually rectangular and is usually mounted so that the long face is horizontal, this small rotational movement is exaggerated to the driver at the edges of the glass. The present invention provides a mounting structure which is constructed to allow uniform limited universal movement in accord with the manipulation of the wires or cables while resisting rotation in all universally shifted or tilted positions. The bracketing structure accordingly eliminates the need for stabilizing pins or ports with their collateral difficulties of location, sizing and coordination with grommets and provides a new simplified and improved mounting on a conceptual basis not previously achieved in remote control rearview mirrors.

THE PRIOR ART

In the U.S. Pat. No. 3,468,186 the stabilizing pins are seen and exemplify the prior stabilizing art.

In the prior art, flexible coupling devices as found in the U.S. Pat. No. 2,860,495, 3,332,255, 3,390,546, 3,393,535, 3,499,299, and 3,597,938 show structures capable of bending while carrying relatively high torque loads. So far as is known, no such devices suggest the structure described herein or an application of a flex coupling device to remote control devices, such as rearview mirrors.

Accordingly, the principal object of the present invention is to provide a remote control support structure for rearview mirrors and the like which at the controlled mirror end achieves quiet and smooth universal movement but provides resistance to rotation in the plane of the mirror. Another object is to provide a new and useful universal coupling mount for devices requiring stabilization in supplement to operational cable or wire supports as are encountered in remote control rearview mirror devices. Still another object is to eliminate a universal connection requiring that plural elements be brought together in close and accurate fit such as ball and socket plural trunnion or pin and socket construction. Other objects resulting in economies and construction simplicity, including integration of resin or plastic parts will be better appreciated as the description proceeds.

GENERAL DESCRIPTION

A remote control rearview mirror comprises an actuator element for location accessible to the driver inside of the automobile and a mirror, support and housing, remote from the actuator, on the outside of the vehicle so the mirror or controlled element is visible to the driver. The mirror and actuator are connected by elements such as Bowden wire cables or wires applying plural force vectors (usually three) selectively to accomplish remote movement of the controlled member in accord with manual manipulation of the remotely located control element or actuator. The cables are passed through the panels, doors, body sections and fenders of an automobile to connection with the mirror. The mirror is supported on a mirror support which is inside or integral with a mirror housing or shroud exteriorly of the vehicle and the connection between housing and mirror is by a universal connection of one-piece resin or plastic construction. The body portion of the universal connection is integral at both ends with support pedestals which extend generally horizontally and transversally of the general axis of the body portion. The body portion is truncated by transverse diagonal cuts leaving a connecting membrane in at least two places and the membranes are in crossed relation with respect to each other and each forms a separate hinge integral with the other and integral with the body and integrally connected to the mounting pedestals. This universal element is connected at one end to the controlled member such as the mirror or mirror back (where the mirror may include a backing) and at the other end the pedestal is fixed to the mirror support bracket or housing. The size of the membrane and the thickness of the membrane is adjustable and the width of the membrane in respect to the diameter of the body portion determines the amount of universal movement available in each of the hinges. Accordingly, with the mounting element so described, the mirror is universally movable limited by the interference contact of the body at the truncations. However, being fixed by one pedestal, the other pedestal resists rotation about an axis through the pedestal at the body. Bowden wires passing through the mirror support element are connected to the mirror or mirror back to allow application of three control vectors of force as remotely imparted by the manipulation of the actuator connected to the other ends of the cable or wires as seen, for example, in U.S. Pat. No. 3,468,186. In the present invention, however, the universal connection is of resin material and both pedestals may be integrated as by casting or molding to form the mirror back or mirror support bracket. The pedestals may also be secured as by cement adhesive material to adjacent support elements. The integrity of the connection makes for quiet performance, amenability to easy manipulation and economic construction.

IN THE DRAWINGS

FIG. 1 is a perspective of a mirror in a mirror housing where the mirror is of the remote control type and the Bowden wires are connected to an actuator remote from the mirror.

FIG. 2 is a full section elevation view taken through the construction of FIG. 1 and showing the resin universal support member connected on one side to the mirror and on the other side to the mirror support bracket.

FIG. 3 is a top elevation view of the universal connector supporting the mirror in FIG. 2 and indicating the two truncations in the body thereof leaving two integral membranes as hinges.

FIG. 4 is an end elevation view of the universal connector seen in FIG. 3 and viewed from the mirror end.

FIG. 5 is a cross-section elevation view taken on the line V—V of FIG. 3 and showing one of the membranes forming a hinge.

FIG. 6 is a cross-section elevation view taken on the line VI—VI of FIG. 3 and indicating another of the membranes formed by truncation of the body portion of the universal hinge at generally right angles to the membrane of FIG. 5.

FIG. 7 is a top plan view of the universal connector tilted in one extreme position.

FIG. 8 is a side elevation view of the universal connector tilted in a plane transverse to the tilt in FIG. 7.

FIG. 9 is a rear elevation view of the mirror back and showing the universal connector secured thereto.

SPECIFIC DESCRIPTION

Referring to the drawing and more specifically to the FIG. 1 thereof, a remote control rearview mirror structure 11 is shown as seen independently of the actuator element which is remote from the mirror structure and operably secured thereto by means of plural Bowden wire cables or wires inside of linear journals in the form of sheaths. The FIG. 1 shows the mirror glass 12 secured movably in the usually decorative mirror housing 13 and the housing 13 includes a stanchion portion 14 including fastening means 15 by means of which the mirror structure 11 is secured to the body or a selected panel as fender or door of an automobile (not shown). Plural Bowden wire elements 16, each comprising a core piece, such as wire or cable 17 and outer sheath or journal 18 enter mirror structure 11 through the stanchion 14. The grouping of the Bowden wire elements 16 are usually secured or bundled loosely together by a plastic or fiber shroud 19. Inside of the mirror housing 13 the glass mirror 12 is universally movable so that upon manipulation of a remote actuator (such as illustrated in U.S. Pat. No. 3,468,186) and not shown here, the movement of the core pieces 17 at the actuator causes corresponding movement at the mirror end and consequent mimicking movement in the mirror 12, limited by clearance within the housing 13.

In FIG. 2 the interior of the housing 13 is exposed to show the universal support element 20 operably fastened to the back of the mirror 12 and secured also to the housing 13. As shown, the universal element 20 is attached to the housing 13 by means of the bracket 21 and the bracket 21 is secured fixedly to the housing 13 by means of the fastener 22, as indicated. The bracket 21 may, as will be appreciated, be integral with the one side 23 of the universal support element 20, and the other side 24 of the universal support element 20 may be in integral support of the mirror glass 12 as by cementing or otherwise attaching to the glass 12. As shown, the pedestal or side 24 of the element 20 is rigidly fastened to a mirror back element 25 which encases the back and edges of the mirror 12 and provides support means in the cavities 26 for the ferrules 27 on the mirror terminal ends of the core pieces 17. In a three wire system these are at 120° intervals about the universal connection 20, as projected to the mirror 12. Sheath sockets 28 are provided in the bracket 21 which compressibly receive the ends of the sheath elements 18 while the core pieces 17 extend therethrough to registering connection with the mirror back 25. In FIG. 3 the universal support element 20 is separated from its supporting structure to reveal the spaced apart but integral base members or pedestals 23 and 24 and integrally connected to each other by the intermediate center block 29. Partial truncations 30 and 31 are provided transversally of the axis of the block 29. As will be seen, these truncations are in spaced adjacent parallel relation but leave connecting membranes 32 and 33, respectively, which are at right angles to each other as best seen in FIG. 4 and in the section views of FIGS. 5 and 6. As will be appreciated, the membranes 32 and 33 provide integral connections in the universal block 29 and the base members 23 and 24 while providing limited rotation in two planes in approximation of universal movement and in resistance of any rotational tendencies in the plane of the mirror 12 despite its selected position. Accordingly, as the core pieces 17 are manipulated remotely in well known manner, the corresponding movement is translated to the mirror 12 and the mirror 12 is universally tilted on the connection 20 without the necessity for supplemental mirror support in resistance of rotation in the plane of the mirror 12. Such stability was formerly approximated by guides, grommets and the like. The extent or amplitude of movement is a function of the thickness of the truncating cuts 30 and 31 in block 29 as well as in the cross section size and form of the center block 29.

The FIGS. 7 and 8 show the relative displacement of the base elements 23 and 24 and indicate the double transverse hinge action that occurs in the universal connection 20 with collapse of the truncations on one side and flextural expansion on the other. These two figures are slightly schematic since some local distortion occurs with material flexure.

The material selected for the integral universal joint 20 is a resin such as polyvinyl chloride, polyethylene, polyurethane, or selected material as sold under the trademarks Delrin, Nylon and the like where the material is rugged, reasonably stable dimensionally, and retains its flexural and memory characteristics over a substantial thermal and static loading range. It may be cast, machined, or injection molded and as indicated, the base or pedestal portions 23 and 24 may be expanded to become, selectively, bracket elements or glass retaining elements.

In the FIG. 9, the preferred embodiment of backing 25 is shown. The raised oblong center portion 35 forms the cavity 26 which supports the ferrules 27 on the mirror ends of the core pieces 17. These project through the openings 36 to the sheath pockets 28 as seen in FIG. 2. Then the universal element 20 is secured by attachment of one of the pedestal tabs or base elements as 23 or 24. The other of the base elements 23 and 24 is secured to the housing 13. The position of universal block 29 is shown in phantom-line.

In operation, the universal connection 20 with its weakened transverse membrane sections 32 and 33 provides an excellent limited universal movement and the self-limiting travel to a position of resin against resin makes the structure relatively rattle-proof and the glass 12 remains secure against rotational tendencies in all positions. Expansion of the integral concept, where desired, results in substantial economy of construction without sacrifice of performance. In fact, smoother movement is experienced in remote control rearview mirrors using this connection since it is not required to overly tension the control wires and as the mirror 12 is tilted on the two transverse hinge axes there are no grommets, guides or bearings to join or seize.

Having thus described our invention and several embodiments thereof, those skilled in the art will readily perceive improvements, changes and modifications therein and such improvements, changes and modifications are intended to be included herein limited only by the scope of the hereinafter appended claims.

We claim:

1. In a remote controlled rearview mirror a universal joint between mirror and mirror support comprising:
    a resin element secured at one end to a mirror back and secured at the other end to a mirror support structure and said resin element having weakened portions forming a limited universal joint tilting in accord with tilting of the mirror in respect to said mirror support structure and resisting rotation of said mirror in the plane of said mirror in all positions of said mirror, said resin element being the only universal joint connection between said mirror and said mirror support.

2. A universal pivot construction for suspension of mirrors and the like in remote control devices comprising:
    a fixed pedestal mounting element;
    a movable pedestal mount in spaced relation from said fixed pedestal mounting and said two mounting elements connected to each other for limited universal movement therebetween by at least two membranes, each providing a hinge at right angles to the other of said hinges in control of separate planes and said membranes, pedestals, and hinges being integrally formed in a resin material.

3. In a remote controlled rearview mirror a universal joint between mirror and mirror support comprising:
    a resin block including a central body portion having a plurality adjacent weakened portions and secured to each other by transverse integral web and the ends of said resin block extending integrally therefrom in mounting pads.

4. A remote controlled rearview mirror element comprising:
    a mirror;
    a mirror case backing said mirror;
    a resin universal pivot block having weakened transverse cross-sections connected at one end to said mirror back;
    a mirror support element connected to the other end of said universal pivot block;
    control elements passing through said mirror support element and connecting to said mirror back whereupon selected movement of said control elements remote from said mirror support and back cause corresponding motion in said mirror back and tilting at said universal pivot block and said block resisting rotation in the plane of said mirror.

5. A control element limited traverse universal support comprising:
    a pair of spaced apart and substantially parallel base members;
    a pair of integral membrane hinges in adjacent spaced apart relation and the axes of the hinges being at right angles to each other; and
    said base members and said hinges being integrally formed from a resin material.

* * * * *